US009896916B2

(12) United States Patent
Ferrari et al.

(10) Patent No.: US 9,896,916 B2
(45) Date of Patent: Feb. 20, 2018

(54) HYBRID ELECTRIC GENERATION PLANT FED BY SOURCES OF A FOSSIL/SOLAR ORIGIN

(71) Applicant: ENI S.P.A., Rome (IT)

(72) Inventors: Marco Ferrari, Tavazzano (IT); Nicola Fiore, Vignate (IT); Valerio Brocco, Rome (IT)

(73) Assignee: ENI S.P.A., Rome (IT)

( * ) Notice: Subject to any disclaimer, the term of this patent is extended or adjusted under 35 U.S.C. 154(b) by 254 days.

(21) Appl. No.: 14/396,015

(22) PCT Filed: May 24, 2013

(86) PCT No.: PCT/EP2013/060715
§ 371 (c)(1),
(2) Date: Oct. 21, 2014

(87) PCT Pub. No.: WO2013/174966
PCT Pub. Date: Nov. 28, 2013

(65) Prior Publication Data
US 2015/0083393 A1 Mar. 26, 2015

(30) Foreign Application Priority Data
May 25, 2012 (IT) .............................. MI2012A0911

(51) Int. Cl.
H02J 3/00 (2006.01)
E21B 43/12 (2006.01)
H02J 3/38 (2006.01)

(52) U.S. Cl.
CPC .............. *E21B 43/128* (2013.01); *H02J 3/38* (2013.01); *H02J 3/383* (2013.01); *Y02E 10/563* (2013.01); *Y10T 307/359* (2015.04)

(58) Field of Classification Search
USPC ........................................................ 307/72
See application file for complete search history.

(56) References Cited

U.S. PATENT DOCUMENTS 6,213,722 B1 * 4/2001 Raos ..................... F04B 47/02
417/417
2008/0078436 A1 4/2008 Nachamkin

OTHER PUBLICATIONS

International Search Report and Written Opinion from International Application No. PCT/EP2013/060715, dated Feb. 4, 2014 (7 pages).

* cited by examiner

*Primary Examiner* — Fritz M Fleming
*Assistant Examiner* — Dru Parries
(74) *Attorney, Agent, or Firm* — Workman Nydegger

(57) ABSTRACT

The present invention relates to an electric generation plant (110) of the type without connection to an distributed electric supply network for generating an alternating electric current destined for a plurality of utilities (105) comprising: a first generator (101) fed with fuel of a fossil origin for generating a first alternating electric current in continuous service, i.e. 24 hours a day; a second photovoltaic generator (102) for generating a second direct electric current by conversion of solar radiation comprising a plurality of inverters (106) of the distributed type for inverting and regulating said current; an electric feeding panel (103) of the power motor control center type fed by said first and second current; an energy management system (104) for regulating said first generator (101) in relation to the electric current generated by said second generator (102) and load requirements of possible electric utilities (105); a resistor (107) for preventing the inlet of electric currents in the first generator (101) potentially dangerous for the same. A further object of the present invention relates to an isolated electric system (100) comprising an electric generation plant (110) as described above for feeding a plurality of electric utilities (105).

8 Claims, 2 Drawing Sheets

HYBRID ELECTRIC GENERATION PLANT FED BY SOURCES OF A FOSSIL/SOLAR ORIGIN

CROSS-REFERENCE TO RELATED APPLICATIONS

This application claims priority to and the benefit of PCT Application No. PCT/EP2013/060715, filed May 24, 2013, entitled "HYBRID ELECTRIC GENERATION PLANT FED BY SOURCES OF A FOSSIL/SOLAR ORIGIN", which claims the benefit of and priority to Italian Patent Application No. MI2012A000911, filed May 25, 2012, each of which is incorporated herein in its entirety.

The present invention relates to a plant for the production of electric energy using sources of a fossil origin combined with renewable sources.

The present invention also relates to a management system of the above energy sources.

In the field of the production of electric energy, systems are known for the production of electricity from sources of a fossil origin, and also systems that exploit solar irradiation for producing electric energy.

In particular in remote and isolated areas from the common national electric supply network, it can be indispensable to have one or more autonomous systems for the production of electric energy.

In the field of oil exploration, it often happens that the extraction zones are situated in remote and isolated areas from common electric supply networks. This is the case for example in plants situated in the desert or on artificial oil extraction islands.

In these types of oil plants, electric generators based on fuels of a fossil origin (gas, petroleum, carbon and the respective derivatives) or electric generators that exploit renewable sources such as the sun and wind, are commonly used.

Isolated electric systems are normally fed by one or more intrinsically similar electric power generators.

These are generally diesel generators, in which a control system automatically regulates the active and reactive power to be supplied in relation to the various loading conditions of the plant.

Alternatively, these isolated electric systems can be fed with generators using renewable sources, comprising one or more battery banks that are charged when the renewable source is available, whereas they distribute power when the renewable source is absent.

Plants with accumulation/battery systems have significant dimensions and costs and, in the present state of the art, they must be frequently subjected to maintenance and periodically reviewed.

The frequency of these activities depends on the entity of thermal variations that these devices must sustain—the greater the thermal variations, the more frequent they will be.

In the oil industry, it often happens that the extraction site coincides with a place where there are adverse thermal conditions (e.g. deserts) and where there is no centralized electric supply network. Under these conditions, there is a greater probability of the above drawbacks arising with a limited availability of spare parts.

When electric plant utilities are fed by battery banks, there are great limitations in the reactive power that can be supplied.

There are numerous problems deriving from the use of batteries, of both an economic and environmental nature.

In particular, battery banks are extremely expensive and must be replaced approximately every 5-10 years. Due to their very nature, moreover, as they are elements containing heavy metals, they have a considerable environmental impact.

In the state of the art, there are also solutions which allow a combination of multiple power generation systems. These are generally the same type of generation system, for example only gas turbines or only diesel generators.

There are also plants that combine various different generation systems, but only for transitory functioning conditions, for example emergency conditions or temporary load disconnections.

Due to their very nature, solar-type plants are current generators which only produce active power. This aspect can cause various drawbacks when the load utility of the plant mainly consists of electric motors having large dimensions.

Large motors absorb a considerable amount of current during the start-up period (six times more with respect to functioning under stationary conditions). When these are directly connected to an electric line, the large amount of current required causes a significant voltage drop, reducing the initial torque and increasing the start-up times.

This high quantity of power is mainly used for overcoming the high internal friction in the start-up phase and is generally characterized by a reactive power absorption from the supply network.

Consequently, when the supply network is weak or mainly consists of active power generators, as in the case of solar plants, it may happen that the motors cannot be started.

Direct current generators such as solar plants or batteries are therefore unsuitable for the timely supply of power necessary for starting up a series of medium and large electric motor machines.

This drawback is especially the case for medium and large-sized motors, such as those installed in oil extraction fields, hereafter called oil fields.

The same drawback can also arise when the utility mainly consists of discharge lamps, electric spot welders, or large air-conditioning plants.

Discharge lamps are often used in oil fields because they generate an extremely high light flow.

The surplus energy required by the above devices in the start-up phase is normally supplied by normal electric supply networks but, in the case of isolated systems, it is normally supplied by an alternator which, by its very nature, generates both active and reactive power.

A possible solution for being able to use a source of a renewable origin can be the one of feeding motor utilities with a small-sized alternator in parallel with a renewable-source generation system, and therefore to generate the reactive power necessary for starting-up the utility and to define the frequency reference.

This solution has the drawback of having to introduce an alternator into the plant, thus increasing the cost.

A further disadvantage of traditional solar plants lies in the fact that the power supplied varies with time depending on the climatic conditions, thus making it difficult to feed utilities functioning continuously.

This requirement is typical of isolated plants, in fact, if the energy produced is introduced into a normal electric supply network, the solar plant will be released from any possible absorption of the same from the network.

In isolated plants, on the other hand, the electric energy produced by the solar plant may not be completely absorbed by the utility. This must therefore be able to be regulated in relation to the absorption conditions of the utilities.

Finally, when the utility prevalently consists of sucker rod pumps, also called tripod pumps, typical of oil fields, a further drawback can arise.

When these pumps are activated by an electric motor, during the descent phase of the counterweight of the balancer, the electric motor of the pump is transformed from a motor to a current generator, as the descending thrust of the counterweight exceeds the force torque of an electric origin. During this phase, the direction of the current is inverted, returning towards the electric generation plant.

If the electric energy is produced by an electric generator based on fuels of a fossil origin, for example a diesel generator, the electric current at the input can cause a rebound of the motor shaft. This aspect involves maintenance cycles and/or repair operations of the electric generator rather frequent.

An objective of the present invention is to overcome the drawbacks mentioned above and, in particular, to provide an electric generation plant hybrid-fed by sources of a fossil origin without accumulation systems of the energy produced.

Another objective of the present invention is to provide an electric generation plant that allows the management and monitoring of flows of electric energy under any operating condition (for example start-up, constant loading, variable loading, etc.) and enables the co-existence of direct current generation together with alternating current generation.

A further objective of the present invention is to provide an electric generation plant that allows a maximization of the electric energy produced by the solar generator safeguarding the generator fed with fuel of a fossil origin.

Another objective of the present invention is to provide an electric system equipped with an electric generation plant that allows the feeding of a plurality of sucker rod pumps avoiding anomalous currents at the input of the generator.

Yet another objective of the present invention is to provide an electric generation plant that minimizes the consumption of sources of a fossil origin and relative GHG emissions into the environment, and allows less frequent maintenance cycles.

A further objective of the present invention is to provide a plant capable of regularizing the electric load absorbed, avoiding high variations of the same with time, and allowing an increase in the number of utilities that can be connected to the same generation plant.

These and other objectives according to the present invention are achieved by providing an electric generation plant of the type without connection to an electric supply network for generating an alternating electric current destined for a plurality of utilities comprising a first generator fed with fuel of a fossil origin for generating a first alternating electric current in continuous service; a second photovoltaic generator for generating a second direct electric current by conversion of solar radiation comprising a plurality of inverters of the distributed type for inverting said second direct current into alternating current and regulating the same; an electric feeding panel of the power motor control center type fed by said first and second current; an energy management system for regulating said first generator in relation to the electric current generated by said second generator and load requirements of possible electric utilities; a resistor for preventing the inlet of electric currents in the first generator potentially dangerous for the same.

Further characteristics of the electric generation plant are object of the dependent claims.

The characteristics and advantages of an electric generation plant of the hybrid type fed by sources of a fossil and solar origin according to the present invention will appear more evident from the following illustrative and non-limiting description, referring to the enclosed schematic drawings, in which.

Figure 1:
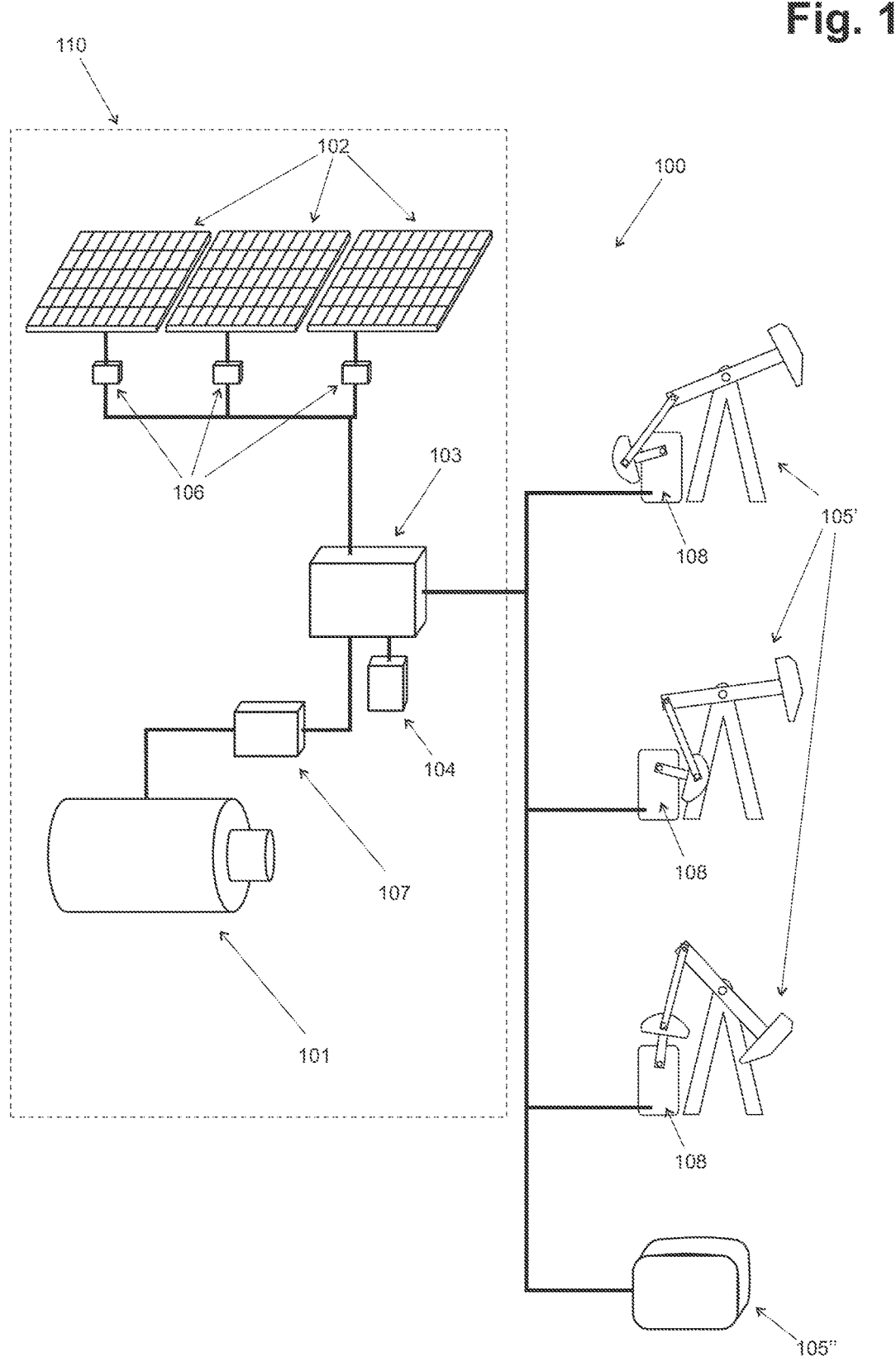
FIG. 1 is a schematic view of an isolated electric system equipped with an electric generation plant.

With reference to the figure, this shows an electric system 100, consisting of an electric generation plant 110 of electric energy and an electric utility 105.

This electric generation plant 110 mainly comprises a first generator 101 fed with fuel of a fossil origin for transforming the mechanical energy generated by a motor, preferably a diesel motor, into electric energy, and a second generator 102 for transforming solar radiation into electric energy.

In particular, the first generator 101 can be a diesel generator for supplying a first alternating electric current preferably having a maximum power of 200 kW.

Said second generator 102, on the other hand, can be a photovoltaic generator composed of solar modules in multicrystalline silicon cells for supplying a second direct electric current. Preferably, said solar modules can have a maximum power of 220 Watt and an efficiency of 13%.

A second generator 102, for example, installed in an oil field can have an extension of 2,500 $m^2$ and supply a peak power up to 110 kW.

Said electric generation plant 110 comprises an electric feeding panel 103 of the power motor control center (PMCC) type which receives said first and second current produced by said first and second generator 101, 102, respectively, and is controlled and managed by an energy management system 104, preferably of the power management system (PMS) type.

The energy management system 104 acquires analogical or digital signals both from possible electric utilities that from the electric feeding panel 103, to which the two generators 101, 102 are connected, in order to detect the electric energy generated by the second generator 102 and the instantaneous requirement of the electric utilities 105 in terms of load required.

Said electric feeding panel 103 together with said energy management system 104 allow the energy supply to be managed in relation to the loads required by the electric utilities 105 and availability of energy produced by the second generator 102.

In particular, said energy management system 104 regulates the first generator 101 in relation to the electric current generated by the second generator 102 and load requirements coming from the electric utilities 105, ensuring a stable and reliable energy supply also for electric utilities 105 operating in environments with a high energy requirement, with electric loads having a high variability range and potentially dangerous, such as the motors of sucker rod pumps in oil fields.

This solution increases the electric efficiency and avoids potential black-out conditions in any type of situation.

Said energy management system 104 can interact directly or through dedicated interfaces with the electric feeding panel 103, and can have the following standard functionalities:

control and management of the first generator 101;
control and management of the second generator 102;
load distribution and load transfer between the various generators;
control of the reactive power;

start-up/shut-down program of the generators 101, 102 depending on the load;

start-up sequence of the first generator 101;

management of the power available with graduated control of the loads.

Said second generator 102 of the photovoltaic type is equipped with a plurality of inverters 106 of the distributed type for inverting said second current from direct to alternating and regulating said second current.

The production of electric energy by the second generator 102 depends on a series of exogenous factors such as the weather conditions or season.

In periods of high energy production, following full solar irradiation, the power supplied by the second generator 102 may exceed the request for energy necessary for the electric utilities 105. To prevent the energy supplied from being wasted or from overloading the isolated electric system 100, said inverters 106 allow the scaling and consequent regulation of the energy supply, by activating/deactivating part of the solar modules forming the second photovoltaic generator 102.

The second electric current produced by the second photovoltaic generator 102 is therefore able to be dosed in relation to the effective necessity.

Figure 2:
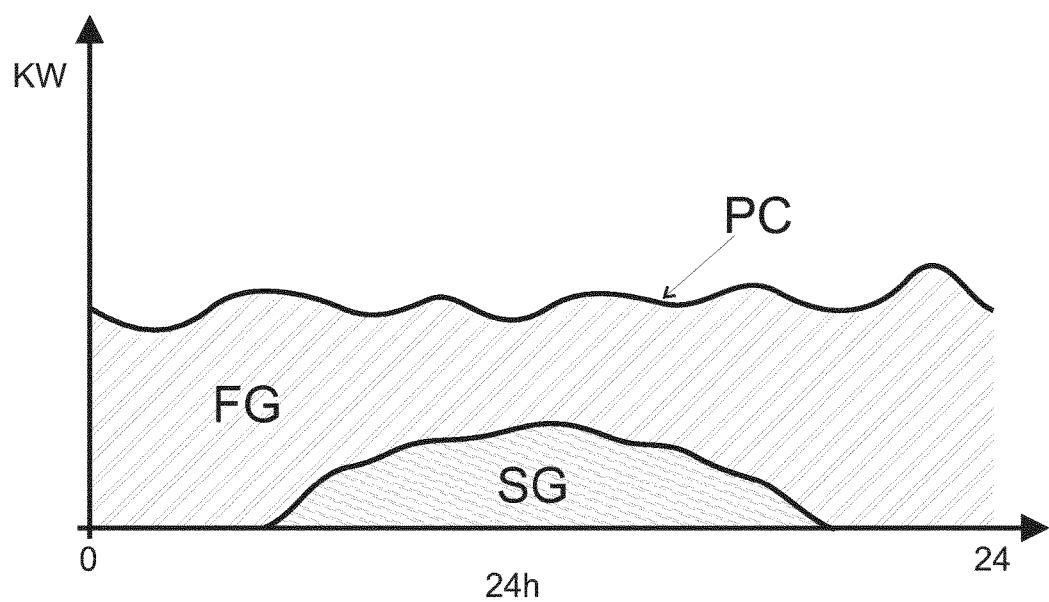
FIG. 2 is a diagram of the energy produced and absorbed by the isolated electric system during a day.

This second electric current can be combined during daylight hours with the first alternating electric current produced by the first generator 101 in order to compensate the request of the electric utilities 105, according to a scheme such as that illustrated in FIG. 2.

The first generator 101 in fact functions in continuous service, i.e. 24 hours a day, to guarantee at least said first alternating current (FG) for the isolated electric system 100.

The second current of the second generator 102 is used directly by the isolated electric system 100 without previous accumulation in batteries or accumulators situated in the generation plant 110.

If the energy of a solar origin (SG) is available, this helps the fossil-type generator 101 to integrate the electric energy supply (PC) to the electric utilities 105, otherwise the electric panel 103 and energy management system 104 will absorb the necessary energy (FG) only from the first generator 101.

In particular, when the utilities 105 of the isolated electric system 100 prevalently comprise counterbalanced sucker rod pumps 105' each activated by asynchronous electric motors, typical of oil fields, the reactive power necessary for the start-up of said pumps 105' is prevalently supplied by the first generator 101.

These pumps 105' are typically destined for the extraction of liquids from the subsoil (water, oil, etc.) and have an anomalous energy absorption cycle.

During the ascending phase of the counterweight, these pumps 105' absorb a high quantity of energy, whereas during the descending phase of the counterweight, the inertia of the same drives the electric motor of the pump in generation rather than absorption of electric energy, transforming it into an electric generator of a third electric current during this phase.

When there are at least two of said pumps 105', they can be offset with respect to each other, and consequently some of them will be in an ascending phase and therefore absorbing electric energy, and others in a descending phase and therefore supplying electric energy.

When this occurs, the energy yielded by the above pumps 105' is used by the electric feeding panel 103 for feeding the remaining pumps 105' or further utilities 105" present in the system 100.

If said third current yielded by said pumps 105' exceeds the energy required by the utilities 105, the electric feeding panel 103 and energy management system 104, send the surplus electric energy to a resistor, also known as breaking unit, to prevent the third current from reaching the first generator 101.

If the third current reaches the first generator 101, in fact, the rotation direction of the alternator can be inverted for a short period of time, causing considerable mechanical stress on the structure and in particular the shaft of the first generator 101, exposing the first generator 101 to the risk of breakage.

Said electric feeding panel 103 and said energy management system 104 can monitor the electric utilities 105 by acquiring with time the signals coming from the same. In particular, these signals acquired by the utilities can be flow-rates and/or pressures measured by suitable instruments, such as for example, transmitters, flowmeters, manometers installed on the wells of oil fields, in order to allow a historization of the absorption profiles of the electric utilities 105 and to prevent possible situations of risk and/or shutdowns. In this way, the inactivity of the pumps 105' present in the oil fields is reduced.

The characteristics of the electric generation plant and isolated electric system, object of the present invention, as also the relative advantages, are evident from the above description.

The combined use of a first generator 101 fed with fuel of a fossil origin and a second photovoltaic generator 102, in fact, allow a reduction in the fuel consumption of the first generator 101 and pollution generated by the same.

Furthermore, as the use of the first generator 101 is thus reduced, the maintenance of the same is also reduced.

The use of the resistor 107, moreover, allows the first generator 101 to be safeguarded from possible currents entering the same, with a consequent reduction in the maintenance activities.

The combination of two generators 101, 102 allows an instantaneous balanced production of electric energy in relation to the availability of the two feeding sources, without the use of accumulators or batteries.

The use of the electric feeding panel 103 and energy management system 104 allows an optimized management of the currents and energy flows at the input/output of the whole plant 110, regardless of the diversity, of both the primary sources (fossil/solar) and electric generation (alternating/direct).

The distributed arrangement of a plurality of inverters allows the electric energy produced by the second generator 102 to be dosed in relation to the requirements of the electric utilities 105.

This electric generation plant 110 is mainly suitable for use in oil extraction plants and in oil fields and where reverse currents are generated, i.e. from the utility towards the generation system.

Finally, numerous modification and variants can obviously be applied to the electric generation plant and isolated electric system thus conceived, all included in the invention; furthermore, all the details can be substituted by technically equivalent elements. In practice, the materials used, as also the dimensions, can vary according to technical requirements.

The invention claimed is:

1. An isolated electric system comprising an electrical generation plant for generating an alternating electric current and a plurality of electric utilities; said electrical generation plant being of the type without connection to an electric supply network for generating an alternating electric current destined for a plurality of utilities, said electrical generation plant comprising:
- a first generator fed with fuel of a fossil origin for generating a first alternating electric current in continuous service;
- a second photovoltaic generator for generating a second direct electric current by conversion of solar radiation comprising a plurality of inverters of the distributed type for inverting said second direct current into alternating current and regulating the same;
- an electric feeding panel of the power motor control center type fed by said first and second current;
- an energy management system for regulating said first generator in relation to the electric current generator by said second generator and charge requirements of possible electric utilities;
- a resistor for preventing the inlet of electric currents in the first generator potentially dangerous for the same;
- wherein said electric utilities comprise a counterbalance to sucker rod pump activated by an asynchronous electric motor for extracting liquids from the subsoil;
- wherein said electric motor generates a third alternating electric current when the counterweight of said counterbalanced sucker rod pump descends by gravity towards the ground, said third electric current being used by the electric feeding panel for feeding said electric utilities.

2. An isolated electric system according to claim 1, wherein said first generator is a diesel generator.

3. The isolated electric system according to claim 1, wherein said resistor receives said third electric current, when there are at least two of said counterbalanced sucker rod pumps and when said third electric current produced by part of or all of said counterbalance sucker rod pump exceeds the absorption of the plurality of electric utilities, to prevent said third electric current from damaging said first generator.

4. The isolated electric system according to claim 1, wherein said third electric current is used by the electric feeding panel for feeding at least another of said electric motors, which is not in generation, when there are at least two of said counterbalanced sucker rod pumps.

5. An isolated electric system for generating an alternating electric current and a plurality of electric utilities, the system comprising:
- an electrical generation plant of the type without connection to an electric supply network for generating an alternating electric current destined for a plurality of utilities, comprising:
  - a first generator fed with fuel of a fossil origin for generating a first alternating electric current in continuous service;
  - a second photovoltaic generator for generating a second direct electric current by conversion of solar radiation comprising a plurality of inverters of the distributed type for inverting said second direct current into alternating current and regulating the same;
  - an electric feeding panel of the power motor control center type fed by said first and second current;
  - an energy management system for regulating said first generator in relation to the electric current generator by said second generator and charge requirements of possible electric utilities; and
  - a resistor for preventing the inlet of electric currents in the first generator potentially dangerous for the same;
- wherein said electric utilities comprise a counterbalance to sucker rod pump activated by an asynchronous electric motor for extracting liquids from the subsoil; and
- wherein said electric motor generates a third alternating electric current when the counterweight of said counterbalanced sucker rod pump descends by gravity towards the ground, said third electric current being used by the electric feeding panel for feeding said electric utilities.

6. The isolated electric system according to claim 5, wherein said first generator is a diesel generator.

7. The isolated electric system according to claim 5, wherein said resistor receives said third electric current, when there are at least two of said counterbalanced sucker rod pumps and when said third electric current produced by part of or all of said counterbalance sucker rod pump exceeds the absorption of the plurality of electric utilities, to prevent said third electric current from damaging said first generator.

8. The isolated electric system according to claim 5, wherein said third electric current is used by the electric feeding panel for feeding at least another of said electric motors, which is not in generation, when there are at least two of said counterbalanced sucker rod pumps.

* * * * *